(12) United States Patent
Wu et al.

(10) Patent No.: US 10,171,135 B2
(45) Date of Patent: Jan. 1, 2019

(54) PRECODING METHOD, APPARATUS, AND SYSTEM

(71) Applicant: Huawei Technologies Co., Ltd., Shenzhen (CN)

(72) Inventors: Tao Wu, Shenzhen (CN); Linjun Lv, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/444,582

(22) Filed: Feb. 28, 2017

(65) Prior Publication Data

US 2017/0170880 A1     Jun. 15, 2017

Related U.S. Application Data

(63) Continuation of application No. PCT/CN2015/074919, filed on Mar. 24, 2015.

(30) Foreign Application Priority Data

Aug. 30, 2014    (CN) .......................... 2014 1 0438821

(51) Int. Cl.
    *H04L 1/06*          (2006.01)
    *H04N 19/164*      (2014.01)
    (Continued)

(52) U.S. Cl.
    CPC ............ *H04B 7/024* (2013.01); *H04B 7/0626* (2013.01); *H04B 7/0634* (2013.01); *H04L 1/00* (2013.01);
    (Continued)

(58) Field of Classification Search
    USPC .......... 375/219, 220, 222, 221, 240, 240.26, 375/240.27, 240.28, 256, 259, 284, 285,
    (Continued)

(56) References Cited

U.S. PATENT DOCUMENTS 8,422,582 B2 *   4/2013   Layec ................. H04B 7/0417
                                                375/267
8,483,310 B2 *   7/2013   Coldrey ............. H04B 7/0617
                                                375/259

(Continued)

FOREIGN PATENT DOCUMENTS

CN         101820405 A       9/2010
CN         102412939 A       4/2012
(Continued)

OTHER PUBLICATIONS

Machine Translation and Abstract of Chinese Publication No. CN102412939, Apr. 11, 2012, 10 pages.

(Continued)

*Primary Examiner* — Linda Wong
(74) *Attorney, Agent, or Firm* — Conley Rose, P.C.

(57) ABSTRACT

The present disclosure relates to embodiments of a precoding method and systems for implementing those embodiments. The embodiments includes receiving, by a level 2 data center, level 1 channel information sent by at least two level 1 data centers, where the level 1 channel information includes a channel matrix between a terminal and the level 1 data center; performing, by the level 2 data center, calculation according to the channel matrix, to obtain a level 2 precoding matrix; and generating, by the level 2 data center, a level 2 signal according to a signal sent to the terminal and the level 2 precoding matrix, and sending the level 2 signal to the level 1 data center. The level 2 data center generates the level 2 signal according to the signal sent to the terminal and the level 2 precoding matrix.

9 Claims, 6 Drawing Sheets

---

A level 2 data center receives level 1 channel information sent by at least two level 1 data centers, where the level 1 channel information includes a channel matrix between a terminal and the level 1 data center     201

The level 2 data center performs calculation according to the channel matrices, to obtain a level 2 precoding matrix     202

The level 2 data center generates a level 2 signal according to a signal sent to the terminal and the level 2 precoding matrix, and sends the level 2 signal to the level 1 data center     203

(51) Int. Cl.
  *H04B 7/06*    (2006.01)
  *H04B 7/024*   (2017.01)
  *H04L 1/18*    (2006.01)
  *H04L 1/00*    (2006.01)

(52) U.S. Cl.
  CPC .......... *H04L 1/0693* (2013.01); *H04L 1/1854* (2013.01); *H04N 19/164* (2014.11)

(58) Field of Classification Search
  USPC ....... 375/278, 293, 295, 296, 316, 324, 340, 375/346, 354, 356, 362, 364, 358; 370/310, 318, 322, 324, 350, 343, 480, 370/479, 503
  See application file for complete search history.

(56) References Cited

U.S. PATENT DOCUMENTS

| | | | | |
|---|---|---|---|---|
| 2007/0104283 | A1* | 5/2007 | Han | H04B 7/0408 375/260 |
| 2008/0260059 | A1* | 10/2008 | Pan | H04B 7/0417 375/260 |
| 2008/0310542 | A1* | 12/2008 | Gao | H04L 1/0028 375/267 |
| 2009/0059860 | A1* | 3/2009 | Maltsev | H04W 72/1236 370/330 |
| 2011/0019715 | A1* | 1/2011 | Brisebois | H04B 7/0626 375/130 |
| 2012/0033723 | A1 | 2/2012 | Wang et al. | |
| 2012/0140708 | A1* | 6/2012 | Choudhury | H04W 72/082 370/328 |
| 2012/0188932 | A1* | 7/2012 | Gong | H04B 7/026 370/312 |
| 2013/0005382 | A1 | 1/2013 | Landstroem et al. | |
| 2013/0089159 | A1 | 4/2013 | Liu | |
| 2013/0114534 | A1* | 5/2013 | Ji | H04L 5/0094 370/329 |
| 2013/0258874 | A1* | 10/2013 | Khoshnevis | H04L 5/0057 370/252 |
| 2014/0140235 | A1* | 5/2014 | Park | H04W 52/244 370/252 |
| 2014/0185528 | A1* | 7/2014 | Shimezawa | H04W 52/42 370/328 |
| 2014/0254701 | A1* | 9/2014 | Geirhofer | H04B 7/0626 375/267 |
| 2014/0269577 | A1* | 9/2014 | Hammarwall | H04B 7/0634 370/329 |
| 2014/0369397 | A1* | 12/2014 | Nakamura | H04B 7/0456 375/232 |
| 2015/0043450 | A1* | 2/2015 | Ariyavisitakul | H04B 7/0452 370/329 |
| 2015/0049688 | A1* | 2/2015 | Yamazaki | H04W 16/28 370/329 |
| 2015/0055518 | A1* | 2/2015 | Park | H04B 7/2643 370/280 |
| 2015/0124769 | A1 | 5/2015 | Zhang et al. | |
| 2015/0295631 | A1* | 10/2015 | Yoshimoto | H04B 7/024 370/329 |

FOREIGN PATENT DOCUMENTS

| | | |
|---|---|---|
| CN | 102948085 A | 2/2013 |
| CN | 103580782 A | 2/2014 |
| EP | 2469917 A1 | 6/2012 |
| EP | 2863567 A1 | 4/2015 |
| WO | 2013017902 A1 | 2/2013 |
| WO | 2013040089 A2 | 3/2013 |
| WO | 2014015660 A1 | 1/2014 |
| WO | 2014109682 A1 | 7/2014 |

OTHER PUBLICATIONS

Chen, L., et al., An Energy Efficient Implementation of C-RAN in HetNet 2014, 5 pages.
Foreign Communication From a Counterpart Application, Chinese Application No. 201410438821.3, Chinese Search Report dated Jul. 26, 2017, 15 pages.
Foreign Communication From a Counterpart Application, PCT Application No. PCT/CN2015/074919, English Translation of International Search Report dated Jul. 2, 2015, 2 pages.
Foreign Communication From a Counterpart Application, PCT Application No. PCT/CN2015/074919, English Translation of Written Opinion dated Jul. 2, 2015, 5 pages.
Foreign Communication From a Counterpart Application, Chinese Application No. 201410438821.3, Chinese Search Report dated Feb. 5, 2018, 2 pages.
Foreign Communication From a Counterpart Application, Chinese Application No. 201410438821.3, Chinese Office Action dated Feb. 24, 2018, 4 pages.
Foreign Communication From a Counterpart Application, European Application No. 15834991.0, European Search Report dated Jul. 13, 2017, 7 pages.

\* cited by examiner

PRECODING METHOD, APPARATUS, AND SYSTEM

CROSS-REFERENCE TO RELATED APPLICATIONS

This application is a continuation of International Application No. PCT/CN2015/074919, filed on Mar. 24, 2015, which claims priority to Chinese Patent Application No. 201410438821.3, filed on Aug. 30, 2014. The disclosures of the aforementioned applications are hereby incorporated by reference in their entireties.

TECHNICAL FIELD

The present disclosure relates to the communications field, and in particular, to a precoding method, apparatus, and system.

BACKGROUND

A networking mode of wireless communications networks has developed from original macro base station macro cell networking to current high-power dense networking. No matter which networking mode is used, signal interference between different cells is always a problem that needs to be handled.

In a high-power dense networking wireless communications system, there are no base-station-centered cells or sectors, because signal coverage areas of different base stations overlap each other. Therefore, a terminal may be jointly covered by multiple base stations. In the prior art, a channel of the terminal is usually fed back to cooperative base stations for cooperation, so as to reduce interference.

However, in such a high-power dense networking scenario, there are many cooperative nodes within network coverage. As a result, complexity of cooperative communication calculation of the cooperative nodes is greatly increased, affecting a cooperative gain of a wireless network.

SUMMARY

Embodiments of the present disclosure provide a precoding method, apparatus, and system, so as to reduce complexity of cooperative communication calculation and increase a cooperative gain of a wireless network in a high-power dense networking scenario.

A first aspect of the embodiments of the present disclosure discloses a precoding method, where the method includes receiving, by a level 2 data center, level 1 channel information sent by at least two level 1 data centers, where the level 1 channel information includes a channel matrix between a terminal and the level 1 data center, performing, by the level 2 data center, calculation according to the channel matrices, to obtain a level 2 precoding matrix, and generating, by the level 2 data center, a level 2 signal according to a signal sent to the terminal and the level 2 precoding matrix, and sending the level 2 signal to the level 1 data center.

With reference to the first aspect, in a first possible implementation manner of the first aspect, the level 1 channel information further includes a level 1 precoding matrix and performing, by the level 2 data center, calculation according to the channel matrices, to obtain a level 2 precoding matrix includes performing, by the level 2 data center, calculation according to the channel matrices and the level 1 precoding matrices, to obtain the level 2 precoding matrix.

A second aspect of the embodiments of the present disclosure discloses another precoding method, where the method includes obtaining, by a level 1 data center, a channel between a terminal and the level 1 data center, where the channel includes a channel matrix, encoding, by the level 1 data center, the channel matrix according to a precoding matrix, and obtaining an equivalent channel, when frequency selectivity of the equivalent channel is less than or equal to frequency selectivity of the channel, sending, by the level 1 data center, the equivalent channel to a level 2 data center, and when the frequency selectivity of the equivalent channel is greater than the frequency selectivity of the channel, sending, by the level 1 data center, the channel matrix and the precoding matrix to the level 2 data center.

With reference to the second aspect, in a first possible implementation manner of the second aspect, before the encoding, by the level 1 data center, the channel matrix according to a precoding matrix, and obtaining an equivalent channel, the method further includes performing, by the level 1 data center, calculation according to the channel matrix, to obtain the precoding matrix.

With reference to the second aspect or the first possible implementation manner of the second aspect, in a second possible implementation manner of the second aspect, after the obtaining an equivalent channel, the method further includes determining the frequency selectivity of the equivalent channel and the frequency selectivity of the channel, and comparing values of the frequency selectivity of the equivalent channel and the frequency selectivity of the channel.

With reference to the second possible implementation manner of the second aspect, in a third possible implementation manner of the second aspect, the determining the frequency selectivity of the equivalent channel and the frequency selectivity of the channel includes calculating a variance of the channel, and determining the frequency selectivity of the channel according to the variance of the channel and calculating a variance of the equivalent channel, and determining the frequency selectivity of the equivalent channel according to the variance of the equivalent channel.

A third aspect of the embodiments of the present disclosure discloses a data center, where the data center includes a receiving unit, configured to receive level 1 channel information sent by at least two level 1 data centers, where the level 1 channel information includes a channel matrix between a terminal and the level 1 data center, a calculation unit, configured to perform calculation according to the channel matrices, to obtain a level 2 precoding matrix, and a generation unit, configured to generate a level 2 signal according to a signal sent to the terminal and the level 2 precoding matrix, and send the level 2 signal to the level 1 data center.

With reference to the third aspect, in a first possible implementation manner of the third aspect, the level 1 channel information further includes a level 1 precoding matrix; and the calculation unit is specifically configured to perform calculation according to the channel matrices and the level 1 precoding matrices, to obtain the level 2 precoding matrix.

A fourth aspect of the embodiments of the present disclosure discloses another data center, where the data center includes an obtaining unit, configured to obtain a channel between a terminal and the level 1 data center, where the channel includes a channel matrix, an encoding unit, configured to encode the channel matrix according to a precoding matrix, and obtain an equivalent channel, and a sending unit, configured to when frequency selectivity of the equivalent channel is less than or equal to frequency selectivity of the channel, send the equivalent channel to a level 2 data center, where the sending unit is further configured to when the frequency selectivity of the equivalent channel is greater than the frequency selectivity of the channel, send the channel matrix and the precoding matrix to the level 2 data center.

With reference to the fourth aspect, in a first possible implementation manner of the fourth aspect, the data center further includes a calculation unit, where the calculation unit is configured to perform calculation according to the channel matrix, to obtain the precoding matrix.

With reference to the fourth aspect or the first possible implementation manner of the fourth aspect, in a second possible implementation manner of the fourth aspect, the data center further includes a determining unit and a comparing unit, where the determining unit is configured to determine the frequency selectivity of the equivalent channel and the frequency selectivity of the channel, and the comparing unit is configured to compare values of the frequency selectivity of the equivalent channel and the frequency selectivity of the channel.

With reference to the second possible implementation manner of the fourth aspect, in a third possible implementation manner of the fourth aspect, the determining unit is configured to calculate a variance of the channel, and determine the frequency selectivity of the channel according to the variance of the channel; and calculate a variance of the equivalent channel, and determine the frequency selectivity of the equivalent channel according to the variance of the equivalent channel.

A fifth aspect of the embodiments of the present disclosure discloses a precoding system, where the precoding system includes the data center described in the third aspect or the first possible implementation manner of the third aspect, and the data center described in the fourth aspect, the first possible implementation manner of the fourth aspect, the second possible implementation manner of the fourth aspect, or the third possible implementation manner of the fourth aspect.

With reference to the first aspect and the third aspect, according to the precoding method and apparatus provided in the embodiments of the present disclosure, the level 2 data center generates a level 2 signal according to a signal sent to the terminal and the level 2 precoding matrix, and sends the level 2 signal to the level 1 data center. The level 2 data center reduces overall complexity of cooperative communication calculation and increases a cooperative gain of wireless communication.

With reference to the second aspect and the fourth aspect, according to the precoding method and apparatus provided in the embodiments of the present disclosure, when frequency selectivity of the equivalent channel is less than or equal to frequency selectivity of the channel, the level 1 data center sends the equivalent channel to a level 2 data center; when the frequency selectivity of the equivalent channel is greater than the frequency selectivity of the channel, the level 1 data center sends the channel matrix to the level 2 data center; and the level 1 data center compares values of the frequency selectivity of the channel and the frequency selectivity of the equivalent channel, and feeds back a channel with a smaller frequency selectivity value to the level 2 data center, thereby reducing a feedback amount and reducing complexity of calculation in a cooperative communication process.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
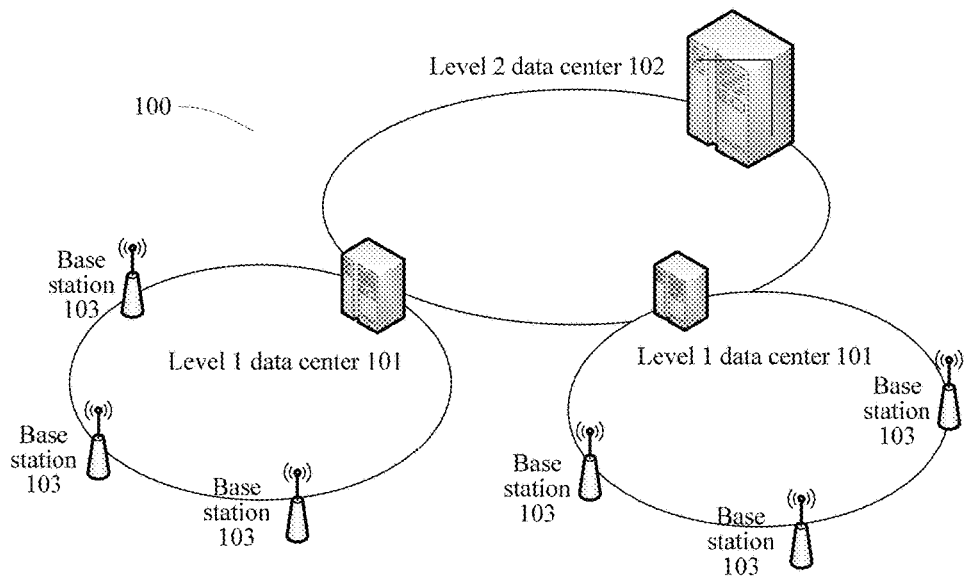
FIG. 1 is an architectural diagram of cooperative communication according to an embodiment of the present disclosure.

FIG. 1 is an architectural diagram 100 of cooperative communication according to an embodiment of the present disclosure. The architectural diagram 100 includes at least two levels of architectures, which are level 1 data centers 101 and a level 2 data center 102 respectively. The level 1 data centers 101 may be base stations 103, and each base station 103 has a multi-antenna array. To enable multiple users to perform cooperative communication, when it is ensured that each user receives a maximum cooperative gain, interference with another user needs to be reduced. Therefore, the level 2 data center 102 may perform cooperative weighting by using channels fed back by the level 1 data centers.

Figure 2:
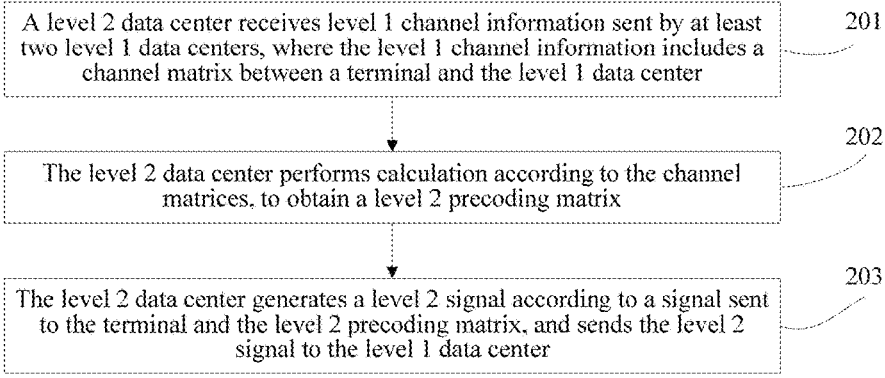
FIG. 2 is a flowchart of a precoding method according to an embodiment of the present disclosure.

FIG. 2 describes a precoding method according to an embodiment of the present disclosure. The method includes step 201 to step 204.

201: A level 2 data center receives level 1 channel information sent by at least two level 1 data centers, where the level 1 channel information includes a channel matrix between a terminal and the level 1 data center.

The level 1 data center may be a device such as a base station. The base station may perform, by using an algorithm such as a minimum mean square error (MMSE) algorithm or a least square (LS) algorithm, channel estimation on a subcarrier on which an uplink pilot is located, to obtain the channel matrix between the base station and the terminal.

The base station may feed back channel matrices between the base station and multiple terminals to the level 2 data center.

The level 2 data center may receive channel matrices fed back by multiple base stations.

The terminal may be an electronic device having a communication function, such as a smartphone or a tablet computer.

The channel matrix may be an original channel obtained after the level 1 data center performs estimation on the uplink pilot by using the MMSE algorithm or the LS algorithm, or the channel matrix may be an equivalent channel obtained after the level 1 data center performs precoding on the original channel.

202: The level 2 data center performs calculation according to the channel matrices, to obtain a level 2 precoding matrix.

After receiving channel matrices sent by multiple level 1 data centers, the level 2 data center combines the received channel matrices, to obtain a combined matrix. The level 2 data center obtains the level 2 precoding matrix according to the combined matrix.

The level 2 data center not only receives channel matrices sent by multiple level 1 data centers, but also receives level 1 precoding matrices sent by multiple level 1 data centers. The level 2 data center performs calculation on the channel matrices and the level 1 precoding matrices, to obtain information about a level 2 channel. The level 2 data center performs calculation on the level 2 channel, to obtain the level 2 precoding matrix.

203: The level 2 data center generates a level 2 signal according to a signal sent to the terminal and the level 2 precoding matrix, and sends the level 2 signal to the level 1 data center.

The level 2 data center encodes, according to the obtained level 2 precoding matrix, a signal sent to the terminal, and generates a level 2 signal. Then, the level 2 data center superposes, according to a correspondence between level 1 data centers and terminals, level 2 signals sent to a same level 1 data center, and sends the superposed level 2 signal to the level 1 data center, so that the level 1 data center sends the superposed level 2 signal to the terminal after processing.

The signal sent to the terminal is a signal sent by a network side to the level 2 data center. The signal is sent to the level 1 data center by using the level 2 data center, and then is sent to the terminal by using the level 1 data center.

As can be known from the above, according to the precoding method provided in this embodiment of the present disclosure, the level 2 data center generates a level 2 signal according to a signal sent to the terminal and the level 2 precoding matrix, and sends the level 2 signal to the level 1 data center. The level 2 data center reduces overall complexity of calculation and increases a cooperative gain of wireless communication.

Optionally, in another embodiment of the present disclosure, based on FIG. 2, the level 1 channel information further includes a level 1 precoding matrix, and step 202 of performing, by the level 2 data center, calculation according to the channel matrices, to obtain a level 2 precoding matrix includes performing, by the level 2 data center, calculation according to the channel matrices and the level 1 precoding matrices, to obtain the level 2 precoding matrix.

The level 1 precoding matrix may be obtained through calculation by the level 1 data center according to the channel matrix.

Figure 3:
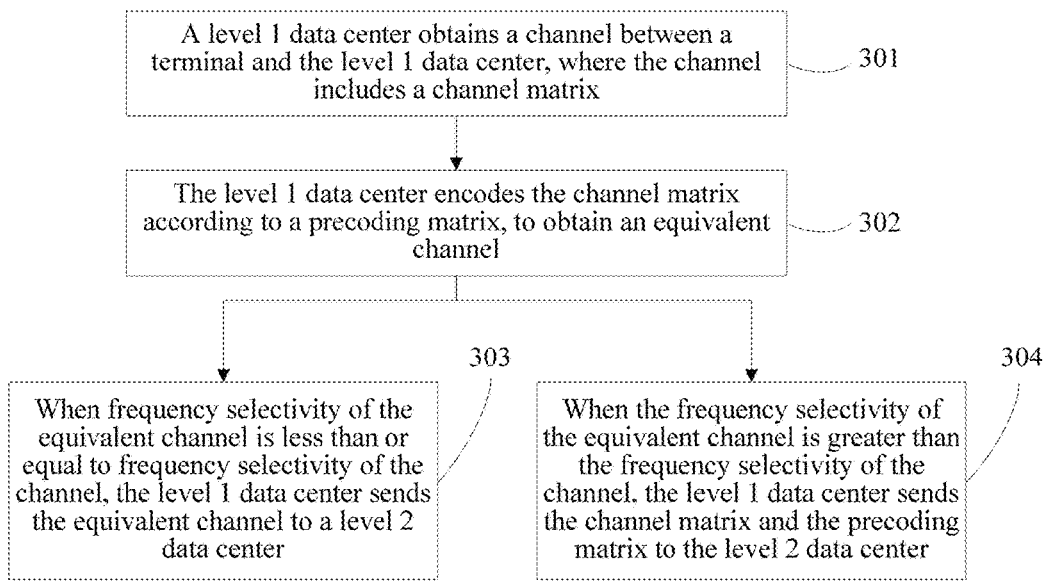
FIG. 3 is a flowchart of another precoding method according to an embodiment of the present disclosure.

As shown in FIG. 3, FIG. 3 describes another precoding method according to an embodiment of the present disclosure. The method includes step 301 to step 304.

301: A level 1 data center obtains a channel between a terminal and the level 1 data center, where the channel includes a channel matrix.

The level 1 data center may be a device such as a base station. The base station may perform, by using an algorithm such as an MMSE algorithm or an LS algorithm, channel estimation on a subcarrier on which an uplink pilot is located, to obtain the channel matrix between the base station and the terminal.

302: The level 1 data center encodes the channel matrix according to a precoding matrix, and obtains an equivalent channel.

The level 1 data center may encode the channel matrix according to the precoding matrix, to obtain an array gain and obtain an equivalent channel.

303: When frequency selectivity of the equivalent channel is less than or equal to frequency selectivity of the channel, the level 1 data center sends the equivalent channel to a level 2 data center.

The level 1 data center may calculate the frequency selectivity of the equivalent channel and the frequency selectivity of the channel, and compare values of the frequency selectivity of the equivalent channel and the frequency selectivity of the channel.

When the frequency selectivity of the equivalent channel is less than or equal to the frequency selectivity of the channel, it indicates that the equivalent channel is relatively stable, and a channel feedback objective can be achieved by feeding back a relatively small quantity of equivalent channels.

304: When the frequency selectivity of the equivalent channel is greater than the frequency selectivity of the channel, the level 1 data center sends the channel matrix and the precoding matrix to the level 2 data center.

When the frequency selectivity of the equivalent channel is greater than the frequency selectivity of the channel, it indicates that the channel is relatively stable, and a channel feedback objective can be achieved by feeding back a relatively small quantity of the channels.

As can be known from the above, according to the precoding method provided in this embodiment of the present disclosure, when frequency selectivity of the equivalent channel is less than or equal to frequency selectivity of the channel, the level 1 data center sends the equivalent channel to a level 2 data center; when the frequency selectivity of the equivalent channel is greater than the frequency selectivity of the channel, the level 1 data center sends the channel matrix to the level 2 data center; and the level 1 data center compares values of the frequency selectivity of the channel and the frequency selectivity of the equivalent channel, and feeds back a channel with a smaller frequency selectivity value to the level 2 data center, thereby reducing a feedback amount and reducing complexity of calculation in a cooperative communication process.

Optionally, in another embodiment of the present disclosure, based on FIG. 3, before the encoding, by the level 1 data center, the channel matrix according to a precoding matrix and obtaining obtain an equivalent channel in step 302, the method further includes step 301 performing, by the level 1 data center, calculation according to the channel matrix, to obtain the precoding matrix.

Optionally, in another embodiment of the present disclosure, based on FIG. 3, after the obtaining an equivalent channel in step 302, the method further includes step 302 determining the frequency selectivity of the equivalent channel and the frequency selectivity of the channel, and comparing values of the frequency selectivity of the equivalent channel and the frequency selectivity of the channel.

Optionally, in another embodiment of the present disclosure, based on FIG. 3, the determining the frequency selectivity of the equivalent channel and the frequency selectivity of the channel includes calculating a variance of the channel, and determining the frequency selectivity of the channel according to the variance of the channel, and calculating a variance of the equivalent channel, and determining the frequency selectivity of the equivalent channel according to the variance of the equivalent channel.

The level 1 data center compares values of the frequency selectivity of the equivalent channel and the frequency selectivity of the channel.

Figure 4:
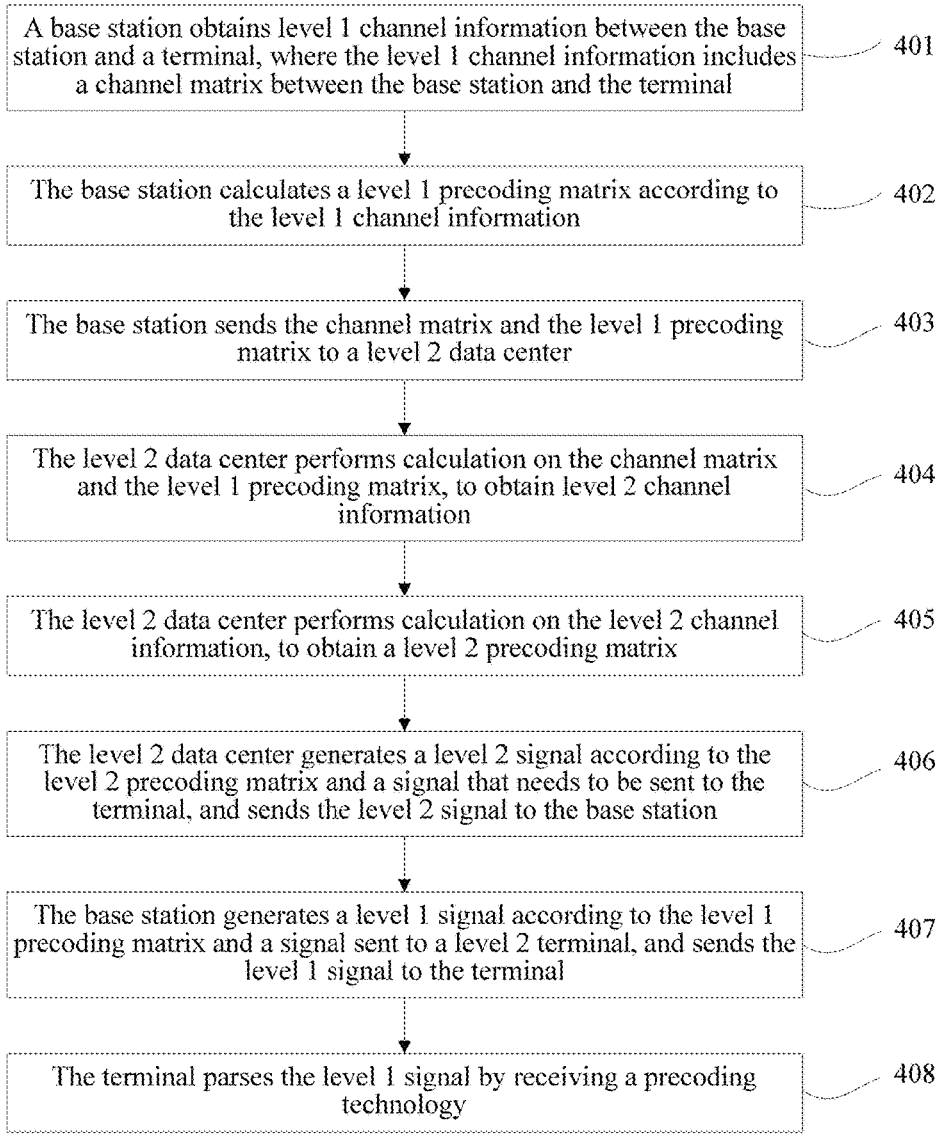
FIG. 4 is a flowchart of another precoding method according to an embodiment of the present disclosure.

FIG. 4 describes a precoding method according to an embodiment of the present disclosure. The method includes step 401 to step 408.

- 401: A base station obtains level 1 channel information between the base station and a terminal, where the level 1 channel information includes a channel matrix between the base station and the terminal.
- 402: The base station calculates a level 1 precoding matrix according to the level 1 channel information.
- 403: The base station sends the channel matrix and the level 1 precoding matrix to a level 2 data center.
- 404: The level 2 data center performs calculation on the channel matrix and the level 1 precoding matrix, to obtain level 2 channel information.
- 405: The level 2 data center performs calculation on the level 2 channel information, to obtain a level 2 precoding matrix.
- 406: The level 2 data center generates a level 2 signal according to the level 2 precoding matrix and a signal that needs to be sent to the terminal, and sends the level 2 signal to the base station.
- 407: The base station generates a level 1 signal according to the level 1 precoding matrix and a signal sent to a level 2 signal, and sends the level 1 signal to the terminal.
- 408: The terminal parses the level 1 signal by receiving a precoding technology.

As can be known from the above, according to the precoding method provided in this embodiment of the present disclosure, a level 2 data center obtains a precoding matrix according to a channel matrix between a terminal and a base station, and encodes, according to the precoding matrix, a signal sent to the terminal, thereby reducing overall complexity of cooperative wireless communication and increasing a cooperative gain.

Figure 5:
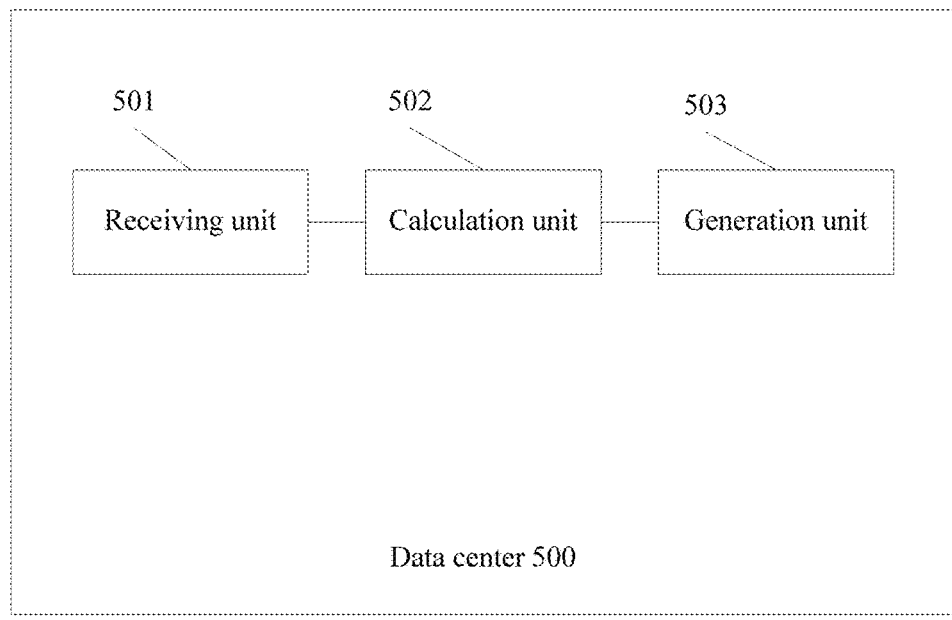
FIG. 5 is a structural diagram of a data center according to an embodiment of the present disclosure.

FIG. 5 describes a data center 500 according to an embodiment of the present disclosure. The data center 500 is configured to execute the precoding method shown in FIG. 2 described above. The data center 500 includes: a receiving unit 501, a calculation unit 502, and a generation unit 503.

The receiving unit 501 is configured to receive level 1 channel information sent by at least two level 1 data centers, where the level 1 channel information includes a channel matrix between a terminal and the level 1 data center.

The calculation unit 502 is configured to perform calculation according to the channel matrices, to obtain a level 2 precoding matrix.

The generation unit 503 is configured to: generate a level 2 signal according to a signal sent to the terminal and the level 2 precoding matrix, and send the level 2 signal to the level 1 data center.

As can be known from the above, according to the data center provided in this embodiment of the present disclosure, the level 2 data center generates a level 2 signal according to a signal sent to the terminal and the level 2 precoding matrix, and sends the level 2 signal to the level 1 data center. The level 2 data center reduces overall complexity of calculation and increases a cooperative gain of wireless communication.

Optionally, as shown in FIG. 5, in another embodiment of the present disclosure, the level 1 channel information further includes a level 1 precoding matrix.

The calculation unit 502 is configured to perform calculation according to the channel matrices and the level 1 precoding matrices, to obtain the level 2 precoding matrix.

Figure 6:
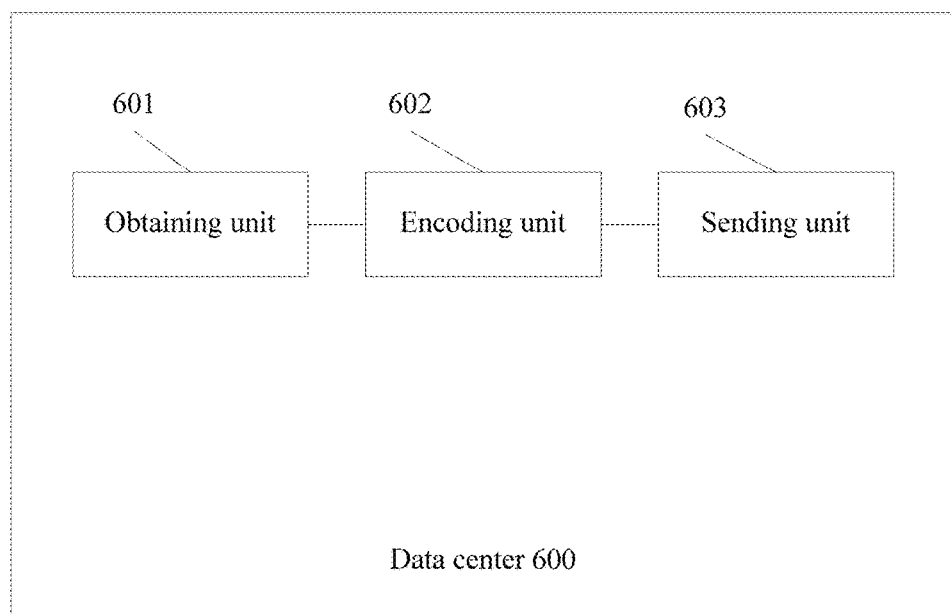
FIG. 6 is a structural diagram of another data center according to another embodiment of the present disclosure.

FIG. 6 describes a data center 600 according to an embodiment of the present disclosure. The data center 600 is configured to execute the precoding method shown in FIG. 3 described above. The data center 600 includes: an obtaining unit 601, an encoding unit 602, and a sending unit 603.

The obtaining unit 601 is configured to obtain a channel between a terminal and the level 1 data center, where the channel includes a channel matrix.

The encoding unit 602 is configured to encode the channel matrix according to a precoding matrix, and obtain an equivalent channel.

The sending unit 603 is configured to: when frequency selectivity of the equivalent channel is less than or equal to frequency selectivity of the channel, send the equivalent channel to a level 2 data center.

The sending unit 603 is further configured to: when the frequency selectivity of the equivalent channel is greater than the frequency selectivity of the channel, send the channel matrix to the level 2 data center.

As can be known from the above, according to the data center provided in this embodiment of the present disclosure, when frequency selectivity of the equivalent channel is less than or equal to frequency selectivity of the channel, the level 1 data center sends the equivalent channel to a level 2 data center; when the frequency selectivity of the equivalent channel is greater than the frequency selectivity of the channel, the level 1 data center sends the channel matrix to the level 2 data center; and the level 1 data center compares values of the frequency selectivity of the channel and the frequency selectivity of the equivalent channel, and feeds back a channel with a smaller frequency selectivity value to the level 2 data center, thereby reducing a feedback amount and reducing complexity of calculation in a cooperative communication process.

Figure 6A:
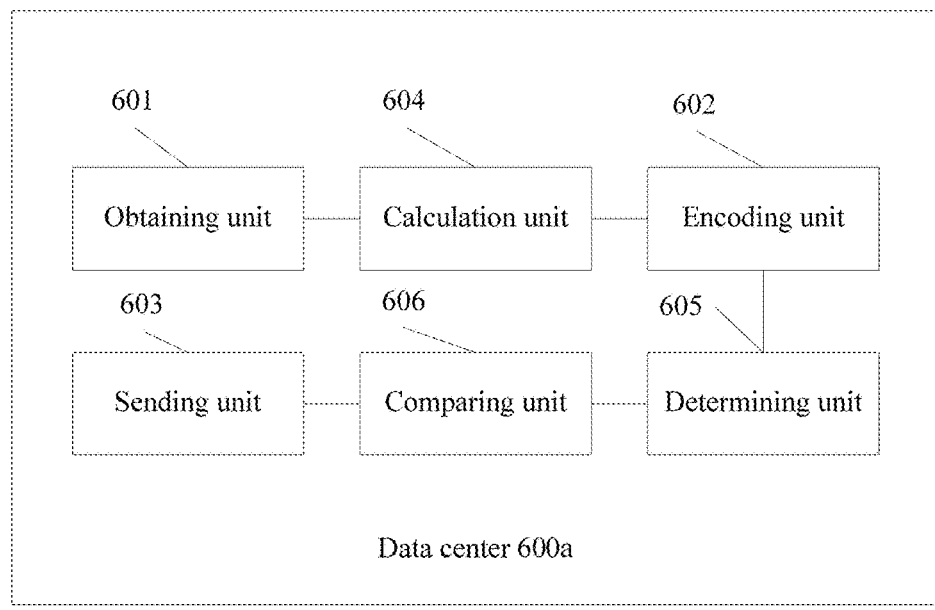
FIG. 6a is a structural diagram of another data center according to another embodiment of the present disclosure.

Optionally, based on FIG. 6, as shown in FIG. 6a, the data center 600a further includes a calculation unit 604.

The calculation unit 604 is configured to perform calculation according to the channel matrix, to obtain the precoding matrix.

Optionally, as shown in FIG. 6, the data center 600a further includes a determining unit 605 and a comparing unit 606.

The determining unit 605 is configured to determine the frequency selectivity of the equivalent channel and the frequency selectivity of the channel.

The comparing unit 606 is configured to compare values of the frequency selectivity of the equivalent channel and the frequency selectivity of the channel.

Optionally, as shown in FIG. 6a, the determining unit 605 is configured to: calculate a variance of the channel, and determine the frequency selectivity of the channel according to the variance of the channel; and is further configured to calculate a variance of the equivalent channel, and determine the frequency selectivity of the equivalent channel according to the variance of the equivalent channel.

Figure 7:
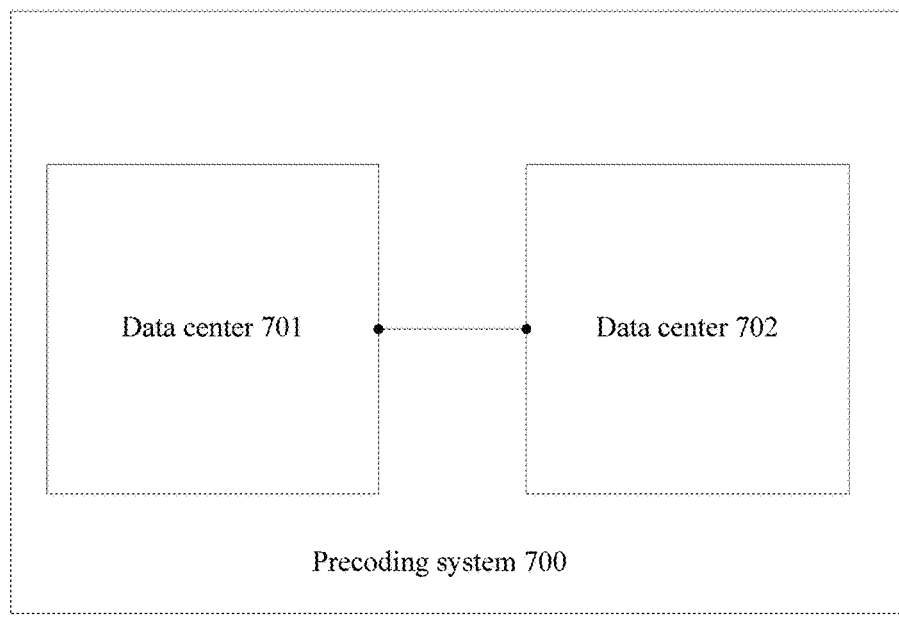
FIG. 7 shows a precoding system according to an embodiment of the present disclosure.

FIG. 7 shows a precoding system 700 according to an embodiment of the present disclosure. The precoding system includes a data center 701 (comparable to data center 500 described in FIG. 5) and a data center 702 (comparable to data center 600 shown in FIG. 6).

Figure 8:
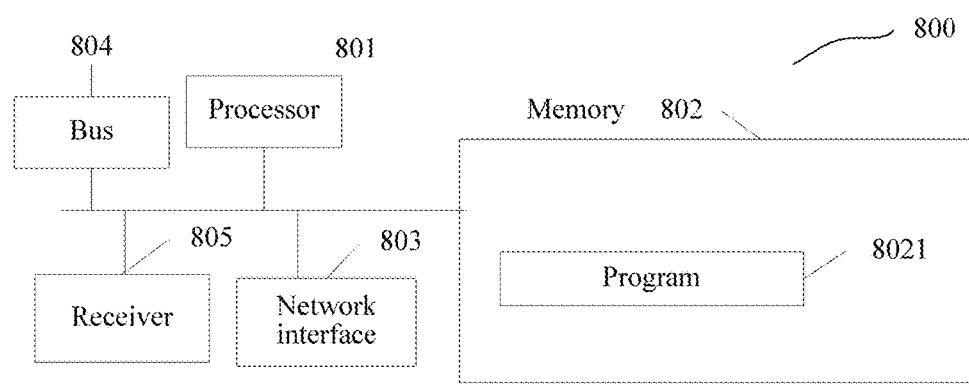
FIG. 8 is a structural diagram of an entity of a data center according to another embodiment of the present disclosure.

FIG. 8 describes a structure of a data center 800 according to another embodiment of the present disclosure. The data center 800 includes at least one processor 801 (for example, a central processing unit (CPU)), a memory 802, at least one network interface 803, at least one communications bus 804, and at least one receiver 805. The communications bus 804 is configured to implement connection and communication between these apparatuses. The processor 801 is configured to execute an executable module, for example, a computer program, stored in the memory 802. The memory 802 may include a high-speed random access memory (RAM), and may further include a non-volatile memory (non-volatile memory), such as at least an embedded multimedia card (eMMC) memory. Communication and connection between the network device and at least another network element are implemented by using the at least one network interface 803 (which may be wired or wireless), where the Internet, a wide area network, a local area network, a metropolitan area network, or the like may be used. The terminal is configured to execute the method for transmitting channel feedback information shown in FIG. 2.

In some implementation manners, the memory 802 stores a program 8021, the program 8021 may be executed by the processor 801, and the program includes receiving, by a level 2 data center, level 1 channel information sent by at least two level 1 data centers, where the level 1 channel information includes a channel matrix between a terminal and the level 1 data center, performing, by the level 2 data center, calculation according to the channel matrices, to obtain a level 2 precoding matrix, and generating, by the level 2 data center, a level 2 signal according to a signal sent to the terminal and the level 2 precoding matrix, and sending the level 2 signal to the level 1 data center.

Implementation steps are the same as those of the embodiment shown in FIG. 2. Details are not described herein again.

Optionally, the level 1 channel information further includes a level 1 precoding matrix; and performing, by the level 2 data center, calculation according to the channel matrices, to obtain a level 2 precoding matrix includes performing, by the level 2 data center, calculation according to the channel matrices and the level 1 precoding matrices, to obtain the level 2 precoding matrix.

Figure 9:
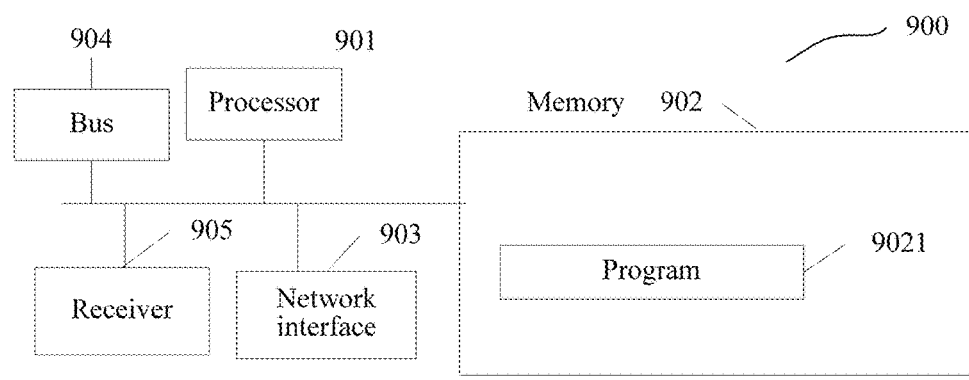
FIG. 9 is a structural diagram of an entity of another data center according to another embodiment of the present disclosure.

As can be known from the above, according to the precoding method provided in this embodiment of the present disclosure, the level 2 data center generates a level 2 signal according to a signal sent to the terminal and the level 2 precoding matrix, and sends the level 2 signal to the level 1 data center. The level 2 data center reduces overall complexity of calculation and increases a cooperative gain of wireless communication. FIG. 9 describes a structure of a base station 900 according to another embodiment of the present disclosure. The base station 900 includes at least one processor 901 (for example, a CPU), a memory 902, at least one network interface 903, at least one communications bus 904, and at least one receiver 905. The communications bus 904 is configured to implement connection and communication between these apparatuses. The processor 901 is configured to execute an executable module, for example, a computer program, stored in the memory 902. The memory 902 may include a RAM, and may further include a non-volatile memory, such as at least an eMMC memory. Communication and connection between the network device and at least another network element are implemented by using the at least one network interface 903 (which may be wired or wireless), where the Internet, a wide area network, a local area network, a metropolitan area network, or the like may be used. The base station 900 is configured to execute the method for transmitting channel feedback information shown in FIG. 3.

In some implementation manners, the memory 902 stores a program 9021, the program 9021 may be executed by the processor 901, and the program includes obtaining, by a level 1 data center, a channel between a terminal and the level 1 data center, where the channel includes a channel matrix, encoding, by the level 1 data center, the channel matrix according to a precoding matrix, and obtaining an equivalent channel, when frequency selectivity of the equivalent channel is less than or equal to frequency selectivity of the channel, sending, by the level 1 data center, the equivalent channel to a level 2 data center, and when the frequency selectivity of the equivalent channel is greater than the frequency selectivity of the channel, sending, by the level 1 data center, the channel matrix and the precoding matrix to the level 2 data center.

Implementation steps are the same as those of the embodiment shown in FIG. 3. Details are not described herein again.

Optionally, before the encoding, by the level 1 data center, the channel matrix according to a precoding matrix, and obtaining an equivalent channel, the program further includes performing, by the level 1 data center, calculation according to the channel matrices, to obtain the precoding matrix.

Optionally, after the obtaining an equivalent channel, the program further includes determining the frequency selectivity of the equivalent channel and the frequency selectivity of the channel, and comparing values of the frequency selectivity of the equivalent channel and the frequency selectivity of the channel.

Optionally, the determining the frequency selectivity of the equivalent channel and the frequency selectivity of the channel includes calculating a variance of the channel, and determining the frequency selectivity of the channel according to the variance of the channel, and calculating a variance of the equivalent channel, and determining the frequency selectivity of the equivalent channel according to the variance of the equivalent channel.

As can be known from the above, according to the precoding method provided in this embodiment of the present disclosure, when frequency selectivity of the equivalent channel is less than or equal to frequency selectivity of the channel, the level 1 data center sends the equivalent channel to a level 2 data center; when the frequency selectivity of the equivalent channel is greater than the frequency selectivity of the channel, the level 1 data center sends the channel matrix to the level 2 data center; and the level 1 data center compares values of the frequency selectivity of the channel and the frequency selectivity of the equivalent channel, and feeds back a channel with a smaller frequency selectivity value to the level 2 data center, thereby reducing a feedback amount and reducing complexity of calculation in a cooperative communication process.

In another embodiment of the present disclosure, a precoding system is provided. The system includes the data center shown in FIG. 8 and the data center shown in FIG. 9.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that all the embodiments described in this specification belong to exemplary embodiments, and the involved actions and modules are not necessarily mandatory to the present disclosure.

Content such as information exchange and an execution process between the modules in the foregoing apparatus and system is based on a same idea as the method embodiments of the present disclosure. Therefore, for detailed content, refer to descriptions in the method embodiments of the present disclosure, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be a magnetic disk, an optical disc, a read-only memory (ROM), a RAM, or the like.

Examples are used in this specification to describe the principle and implementation manners of the present disclosure. The descriptions of the foregoing embodiments are merely intended to help understand the method and idea of the present disclosure. In addition, with respect to the implementation manners and the application scope, modifications may be made by a person of ordinary skill in the art according to the idea of the present disclosure. Therefore, this specification shall not be construed as a limitation on the present disclosure.

What is claimed is:

1. A precoding method for a level 1 data center comprising:
    obtaining, by the level 1 data, center, a channel information signal between a terminal and the level 1 data center, wherein the channel information signal comprises a channel matrix;
    encoding, by the level 1 data center, the channel matrix according to a precoding matrix to obtain an equivalent channel;
    sending, by the level 1 data center, the equivalent channel to a level 2 data center for further processing when a frequency selectivity of the equivalent channel is less than or equal to a frequency selectivity of the channel; and
    sending, by the level 1 data center, the channel matrix and the precoding matrix to the level 2 data center for further processing when the frequency selectivity of the equivalent channel is greater than the frequency selectivity of the channel.

2. The method according to claim 1, wherein before the encoding, the method further comprises performing, by the level 1 data center, a calculation according to the channel matrix to obtain the precoding matrix.

3. The method according to claim 1, wherein after obtaining the equivalent channel, the method further comprises:
    determining, by the level 1 data center, the frequency selectivity of the equivalent channel and the frequency selectivity of the channel; and
    comparing, by the level 1 data center, values of the frequency selectivity of the equivalent channel and the frequency selectivity of the channel.

4. The method according to claim 3, wherein determining, by the level 1 data center, the frequency selectivity of the channel comprises:
    calculating a variance of the channel; and
    determining the frequency selectivity of the channel according to the variance of the channel and
    wherein determining the frequency selectivity of the equivalent channel comprises:
    calculating a variance of the equivalent channel; and
    determining the frequency selectivity of the equivalent channel according to the variance of the equivalent channel.

5. A data center comprising: a processor configured to:
    obtain a channel information signal between a terminal and the data center,
    wherein the channel Information signal comprises a channel matrix; and
    encode the channel matrix according to a precoding matrix; and
    obtain an equivalent channel; and
    a transmitter coupled with the processor, wherein the transmitter is configured to:
    send the equivalent channel to a level 2 data center for further processing when frequency selectivity of the equivalent channel is less than or equal to frequency selectivity of the channel; and
    send the channel matrix and the precoding matrix to the level 2 data center for further processing when the frequency selectivity of the equivalent channel is greater than the frequency selectivity of the channel.

6. The data center according to claim 5, wherein the processor is further configured to perform a calculation according to the channel matrix to obtain the precoding matrix.

7. The data center according to claim 5, wherein the processor is further configured to:
    determine the frequency selectivity of the equivalent channel and the frequency selectivity of the channel; and
    compare values of the frequency selectivity of the equivalent channel and the frequency selectivity of the channel.

8. The data center according to claim 7, wherein the processor is further configured to:
    calculate a variance of the channel;
    determine the frequency selectivity of the channel according to the variance of the channel;
    calculate a variance of the equivalent channel; and
    determine the frequency selectivity of the equivalent channel according to the variance of the equivalent channel.

9. A precoding system comprising:
a level 2 data center; and a level 1 data center,
wherein the level 2 data center comprises:
- a receiver configured to receive level 1 channel information sent by the level 1 data center; and
- a processor coupled with the receiver, wherein the processor is configured to:
  - perform calculation according to the level 1 channel information to obtain a level 2 precoding matrix;
  - generate a level 2 signal according to a signal sent to the terminal and the level 2 precoding matrix; and
  - send the level 2 signal to the level 1 data center, and wherein the level 1 data center comprises:
- a processor configured to:
  - obtain a channel information signal between a terminal and the level 1 data center, wherein the channel comprises a channel matrix; and
  - encode the channel matrix according to a precoding matrix, and obtain an equivalent channel; and
- a transmitter coupled with the processor, wherein the transmitter is configured to:
  - send the equivalent channel to the level 2 data center as the level 1 channel information when frequency selectivity of the equivalent channel is less than or equal to frequency selectivity of the channel; and
  - send the channel matrix and the precoding matrix to the level 2 data center as the level 1 channel information when the frequency selectivity of the equivalent channel is greater than the frequency selectivity of the channel.

* * * * *